(12) United States Patent
Gumpoltsberger et al.

(10) Patent No.: US 8,733,526 B2
(45) Date of Patent: *May 27, 2014

(54) ELECTROMECHANICAL ACTUATING ASSEMBLY

(75) Inventors: Gerhard Gumpoltsberger, Friedrichshafen (DE); Benjamin Schneider, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 194 days.

This patent is subject to a terminal disclaimer.

(21) Appl. No.: 13/391,420

(22) PCT Filed: Aug. 12, 2010

(86) PCT No.: PCT/EP2010/061777
§ 371 (c)(1),
(2), (4) Date: Feb. 21, 2012

(87) PCT Pub. No.: WO2011/023566
PCT Pub. Date: Mar. 3, 2011

(65) Prior Publication Data
US 2012/0145510 A1    Jun. 14, 2012

(30) Foreign Application Priority Data
Aug. 31, 2009 (DE) .......................... 10 2009 029 005

(51) Int. Cl.
*F16D 28/00* (2006.01)

(52) U.S. Cl.
USPC ...................... 192/84.7; 192/70.11; 192/93 R; 192/99 S

(58) Field of Classification Search
USPC ................................ 192/89.29; 74/38, 106
See application file for complete search history.

(56) References Cited

U.S. PATENT DOCUMENTS

| | | | | |
|---|---|---|---|---|
| 2,032,735 A * | 3/1936 | Blanchard et al. | .......... | 192/99 R |
| 2,991,863 A | 7/1961 | Glesmann et al. | | |
| 3,005,530 A * | 10/1961 | Fawick | ........................ | 192/99 S |
| 3,023,568 A * | 3/1962 | Gilliland | ...................... | 192/84.6 |
| 3,200,597 A * | 8/1965 | Stotz | ............................... | 74/106 |
| 5,106,349 A | 4/1992 | Botterill et al. | | |
| 6,167,997 B1 * | 1/2001 | Keeney | ......................... | 192/84.6 |
| 6,502,671 B2 * | 1/2003 | Hayford et al. | ............. | 188/72.7 |
| 2002/0092716 A1 | 7/2002 | Hayford et al. | | |
| 2004/0108175 A1 | 6/2004 | Schautt | | |
| 2006/0213747 A1 | 9/2006 | Matzschker | | |
| 2006/0278489 A1 | 12/2006 | Puiu | | |
| 2012/0145509 A1 * | 6/2012 | Gumpoltsberger et al. | . | 192/84.6 |

FOREIGN PATENT DOCUMENTS

| | | |
|---|---|---|
| AT | 007019 U1 | 7/2004 |
| DE | 39 15 959 A1 | 11/1990 |
| DE | 41 40 122 A1 | 6/1993 |
| DE | 197 00 936 A1 | 7/1997 |
| DE | 101 56 348 C1 | 4/2003 |

(Continued)

*Primary Examiner* — Rodney Bonck
(74) *Attorney, Agent, or Firm* — Davis & Bujold, PLLC; Michael J. Bujold

(57) ABSTRACT

An electromechanical actuating assembly for at least an actuator element of a vehicle transmission with at least a drive device which activates a spindle drive (2) of an actuator device to actuate the actuator element. The actuator device comprises a toggle lever mechanism (4) which is activated via the spindle drive (2), and the actuator device is positioned coaxially with a transmission shaft (5) of the vehicle transmission and is positioned radially inside or radially outside with reference to the actuator element.

10 Claims, 2 Drawing Sheets

(56) References Cited

FOREIGN PATENT DOCUMENTS

| | | | |
|---|---|---|---|
| DE | 102 36 516 A1 | 2/2004 |
| DE | 103 08 886 B3 | 4/2004 |
| DE | 102 58 836 A1 | 7/2004 |
| DE | 103 03 984 A1 * | 9/2004 |
| DE | 103 16 949 A1 | 11/2004 |
| DE | 10 2005 021460 A1 | 11/2006 |
| DE | 10 2007 007 468 A1 | 6/2008 |
| DE | 10 2008 016783 A1 | 10/2009 |
| EP | 1 225 363 A2 | 7/2002 |
| EP | 1 400 716 A1 | 3/2004 |
| WO | 2005/012751 A1 | 2/2005 |

* cited by examiner

ELECTROMECHANICAL ACTUATING ASSEMBLY

This application is a national stage completion of PCT/EP2010/061777 filed Aug. 12, 2010 which claims priority from German Application Serial No. 10 2009 029 005.2 filed Aug. 31, 2009.

FIELD OF THE INVENTION

The present invention concerns an electromechanical actuating assembly for at least one shift element of a vehicle transmission.

BACKGROUND OF THE INVENTION

Known, for instance, from the publications US 2006/0 278 489 A1 and DE 102 58 836 A1 are electromechanical clutch actuators for a vehicle clutch, where their adjustments are controlled via an additional, pneumatic or hydraulic system. The clutch actuator which is known through DE 102 58 836 A1 comprises, for instance, a magnetic valve with which a pressure equalization channel between two piston chambers is opened or closed so as to control the movement of settings. These configurations result in complicated structures which require significant space.

Known from the publication DE 101 56 348 C1 is an electromechanical brake. The known brake has the disadvantage that larger adjustment forces for actuating the brake are required. Due to the complicated construction, a large number of components are required so that a significant amount of space is required.

SUMMARY OF THE INVENTION

The present invention has the task to improve an electromechanical actuating assembly of the above described type in a way, so that the best possible compact construction is realized.

Thus, an electromechanical actuating assembly for at least one actuator element, for instance for a load actuator element of an automatic transmission of a vehicle with at least a drive device which drives a spindle drive of an adjustment device for activating the actuator element, wherein the adjustment device comprises a toggle lever mechanism which is activated by the spindle drive and wherein the adjustment device is positioned almost coaxial to a transmission shaft of the vehicle transmission and which is provided, radial inside or radial outside, by the adjustment element.

The result is a construction space saving design of the actuating assembly because, for instance, a present but unutilized construction space can be used for positioning the adjustment device. Due to the coaxially positioned adjustment device in reference to the transmission shaft, an especially compact construction results, and where altogether a minimum of construction space is required to accommodate the inventive actuating assembly. However, other accommodation possibilities can be envisioned which will also reduce the required construction space.

In addition, the proposed actuating assembly represents a large transmission ratio due to the toggle lever mechanism. By means of the electromechanical actuating assembly, a savings of power, when compared to hydraulic drives, can be achieved due to the reduction of the required hydraulic power. Also, it results in a better, required power matching of the energy supply from the on board power at the electric power supply device of the inventive actuating assembly. Furthermore, expensive ducts and hydraulic parts which are necessary for a hydraulic drive can be omitted. Another advantage is the fact that the inventive actuating assembly allows the realization of a start-stop function of the combustion engine and of a hybrid drive.

In the context of an embodiment variation of the invention it can be provided that the toggle lever mechanism comprises a toggle lever which is activated in a way via an axially movable ramp contour by the spindle drive, so that the toggle lever extends radially, so that it can activate the actuator element or rather the multidisc clutch, with a lever which is coupled with the toggle lever. Through the provided lever combination of toggle lever and lever, not only a large transmission ratio is achieved, but also an actuator force is not required when the lever is in its dead spot.

A possible embodiment of the invention can provide that the toggle lever extends radially to the outside by means of the ramp contour when the actuator element is positioned radially, within a multidisc carrier of the multidisc clutch which is designed as the actuator element, so that the lever presses together the multidisc cluster of the multidisc clutch with the generated actuator force or engages the multidisc clutch, respectively. If the actuator device is positioned radially, outside of the multidisc carrier of the multidisc clutch, the toggle lever can extend to the inside by means of the ramp contour so that the lever engages the multidisc clutch. Also other constructive embodiments are possible to realize actuating the multidisc clutch in an especially construction space saving way.

In accordance with a further possible, advantageous embodiment it can be provided that the toggle lever of the toggle lever mechanism is designed at least as a rotationally symmetrical, bendable plate or similar. For instance, a multi-piece part can be used as the toggle lever where, for instance, the parts are linked together by joints. It is especially advantageous when the toggle lever is designed in a way so that it exhibits an indefinitely large hold function at its dead spot.

The lever of the lever mechanism for actuating the multidisc cluster of the multidisc clutch is coaxially positioned to it and preferably designed as a ring shaped, bendable sheet metal plate. Hereby, the lever can easily be activated via the toggle lever which is also coaxially positioned. For instance, a first end of the lever can be coupled with the toggle lever and a second end of the lever can be assigned to the multidisc clutch, whereby the lever, between its ends, is firmly supported by the housing to enable the lever function.

The toggle lever mechanism is coupled with the spindle drive via the ramp contour for radially spreading of the toggle lever. Preferably, the ramp contour can be designed as a ball ramp or similar where its first ring half is coupled with the spindle drive and its second ring half is coupled, via a wedge shaped element or similar, with the toggle lever. The two ring halves can have a pivotable bearing next to each other, for instance, through at least a roller element so that, by axially adjusting of the spindle drive, the wedge shaped element is moved accordingly, so that a radially oriented force can be transferred to the toggle lever for its spreading.

Preferably, the proposed electromechanical actuating assembly can be used for activating load actuator elements in automatic transmissions. Also, other applications are possible.

BRIEF DESCRIPTION OF THE DRAWINGS

Hereafter, the present invention is further explained through the drawings. It shows.

DETAILED DESCRIPTION OF THE PREFERRED EMBODIMENTS

Figure 1:
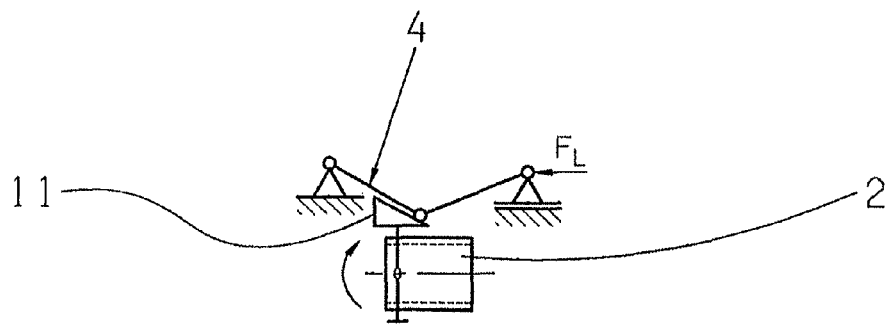
FIG. 1 a schematic presentation of the general operating principle of an actuating assembly in accordance with the invention.

FIG. 1 is a drawing of the general operating principle of the proposed electromechanical actuating assembly. It can be seen from the presentation that the actuating assembly is driven by an electric motor 1, designed as the drive device, a spindle drive 2 of an adjustment device for activating an actuator element, which in the drawings is designed for example as a multidisc clutch 3. The adjustment device also comprises a toggle lever mechanism 4 which is activated via the spindle drive 2. The toggle lever mechanism 4 is radially spread via a ramp contour via the spindle drive 2, to act upon the multidisc clutch 3 with a predetermined adjustment force ($F_L$).

Figure 2:
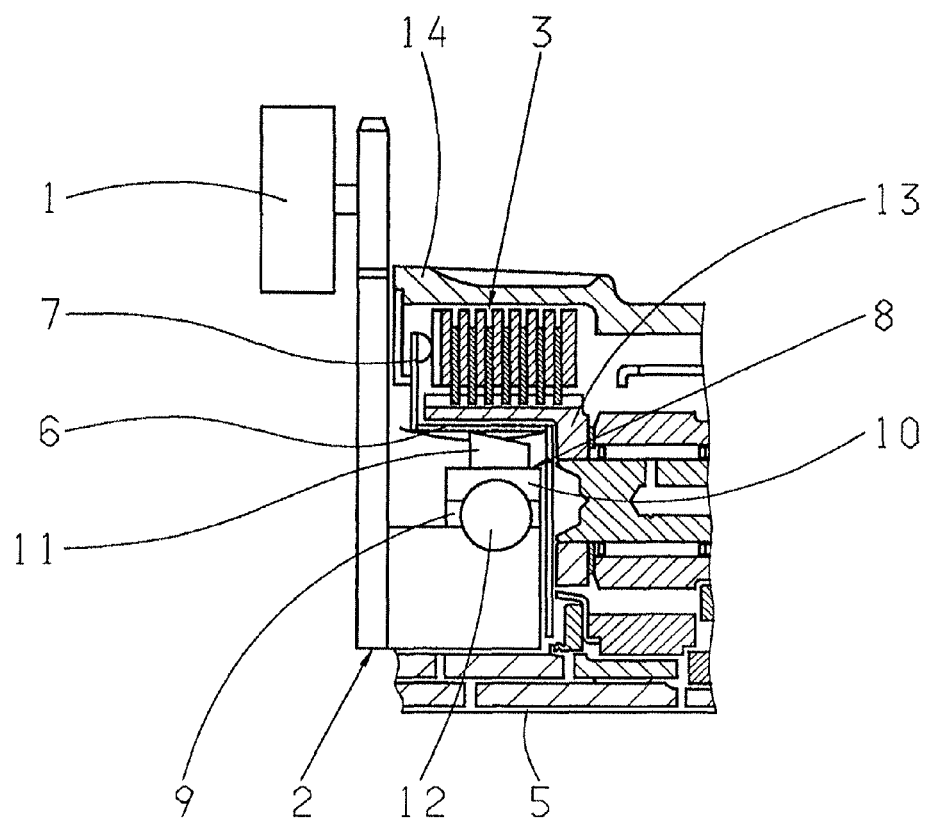
FIG. 2 a sectional view of a first possible embodiment variation of the inventive actuating assembly in a transmission housing of a vehicle.
Figure 3:
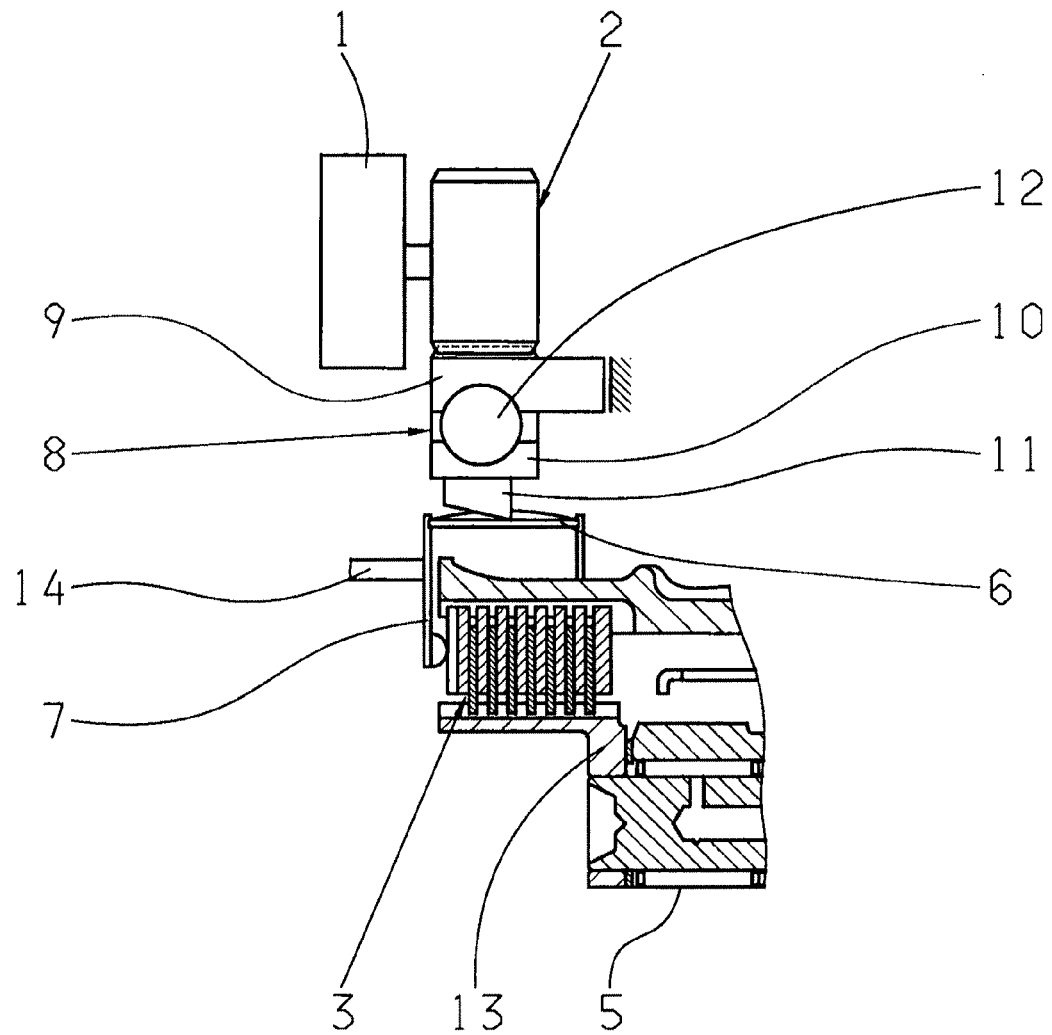
FIG. 3 a section cut view of a second possible embodiment variation of the inventive actuating assembly in the transmission housing of a vehicle.

It can especially be seen in FIGS. 2 and 3 that the adjustment device in the inventive actuating assembly is nearly coaxially positioned with a transmission shaft 5 of the vehicle transmission, wherein the adjustment device is provided radially inside or radially outside, with reference to the multidisc clutch 3. That results in a construction space reduced configuration and at the same time, due to the applied toggle lever mechanism, a large transmission ratio for the activation of the multidisc clutch 3.

A first possible embodiment variation is shown in FIG. 2, in which the adjustment device is positioned radial within the multidisc carrier 13 of the multidisc clutch 3. Contrary to it, FIG. 3 presents a second embodiment variation, in which the complete actuating assembly is positioned outside of the multidisc carrier 13.

Independent of the respective embodiment variation, the toggle lever mechanism 4 comprises a toggle lever 6 which is axially moved by a ramp contour via the spindle drive 2 in such a way that the toggle lever 6 is radially splayed so that a lever 7, which is coupled with the toggle lever 6, activates the multidisc clutch 3. The toggle lever 6 is designed as a rotationally symmetrical, bendable metal plate. The lever 7 is provided as a ring shaped, bendable metal plate. The lever 7, as well as the toggle lever 6, are each positioned coaxially in reference to the multidisc clutch 3.

The ramp contour is created by a ball ramp 8, and its first ring half 9 is coupled with the spindle drive 2 and its second ring half 10 is coupled, via a wedge shaped element 11, with the toggle lever 6. The two ring halves 9, 10 are rotatably mounted to each other by means of the roller bearing 12. Through the axial movement of the spindle drive 2, the wedge shape element 11 is also moved axially, so that the toggle lever is radially splayed due to its changing slope along the wedge element 11. Thus, the lever element 6, as a rotationally symmetrical element, is guided by the slope concept which is created by the spindle drive 2 and the ramp contour. The control of the actuating assembly happens by sliding of the slope concept in the axial direction.

Since the first embodiment variation has at least the toggle lever mechanism normal 4 integrated in the construction space between the multidisc carrier 13 and the transmission shaft 5, the result is little, required construction space. The second embodiment variation has the advantage that the complete actuating assembly can be positioned outside, to save construction space within the transmission. Independent of each embodiment variation, the toggle lever 6 transmits its received adjustment force via a lever transmission ratio to the multidisc cluster of the multidisc clutch 3, which creates a large transmission ratio. Thus, the lever 7 is nearly centrally supported in the center, between its ends, at the transmission enclosure 14.

REFERENCE CHARACTERS

1. Electric Motor
2. Spindle Drive
3. Multidisc clutch
4. Toggle Lever Mechanism
5. Transmission Shaft
6. Toggle Lever
7. Lever
8. Ball Ramp
9. First Ring Half
10. Second Ring Half
11. Wedge Shaped Element
12. Roller Element
13. Multidisc Carrier
14. Transmission Enclosure

The invention claimed is:

1. A multi-disc clutch electromechanical actuating assembly of a vehicle transmission with at least a drive device which activates a spindle drive (2) for axially actuating a multi-disc cluster of the multi-disc clutch, and an actuator device comprising:
    a toggle lever mechanism (4) which is activated via the spindle drive (2),
    a toggle lever (6) of the toggle lever mechanism (4) being activated, via the spindle drive (2), by an axially movable ramp contour that is radially spaced from the multi-disc clutch by the toggle lever (6),
    the toggle lever (6) being radially splayed so that a lever (7), which is coupled with the toggle lever (6), axially actuates the multi-disc clutch, and
    the actuator device being positioned either radially inside or radially outside with reference to the multi-disc clutch and also being positioned substantially coaxially with a transmission shaft (5) of the vehicle transmission.

2. The multi-disc clutch electromechanical actuating assembly according to claim 1, wherein the lever (7), which is coupled with the toggle lever (6), axially actuates the multi-disc clutch by applying an axial force on a face of the multi-disc clutch for pressing together the multi-disc cluster of the multi-disc clutch, and
    the ramp contour is a ball ramp (8) which has a first ring half (9) that is coupled with the spindle drive (2) and a second ring half (10) that is coupled with the toggle lever (6), via a wedge shaped element (11).

3. The multi-disc clutch electromechanical actuating assembly according to claim 2, wherein
    the toggle lever (6), in the actuator device which is positioned radially inside of the multidisc clutch (3), is splayed radially to the outside by the ramp contour such that the lever (7) engages the multidisc clutch (3) by a generated actuator force.

4. The multi-disc clutch electromechanical actuating assembly according to claim 2, wherein
    the toggle lever (6), in an actuator device which is positioned radially outside of the multidisc plate clutch (3), is splayed radially to the inside by the ramp contour so that the lever (7) engages the multidisc clutch (3) by a generated actuator force.

5. The multi-disc clutch electromechanical actuating assembly according to claim 3, wherein a first end of the lever (7) is coupled with the toggle lever (6) and a second end of the lever (7) is coupled to the multidisc clutch (3), and the lever (7) is firmly supported between opposed ends thereof by a housing.

6. The multi-disc clutch electromechanical actuating assembly according to claim 3, wherein the first and the second ring halves (9, 10) are rotatably mounted adjacent each other via at least one roller element (12).

7. The multi-disc clutch electromechanical actuating assembly according to claim 1, wherein the toggle lever (6) is designed at least as a rotationally symmetrical, bendable metal plate.

8. The multi-disc clutch electromechanical actuating assembly according to claim 1, wherein the lever (7) is a bendable ring shaped, metal plate.

9. An electromechanical actuating assembly for a multidisc clutch (3) of a vehicle transmission, the electromechanical actuating assembly having at least a drive device for activating an actuator device, including a spindle drive (2), and actuating the multidisc clutch (3), and the actuator device comprising:
   a toggle lever mechanism (4) being activated via the spindle drive (2);
   the actuator device being positioned either radially inside or radially outside with reference to an actuator element;
   the actuator device being positioned substantially coaxially with a transmission shaft (5) of the vehicle transmission;
   a toggle lever (6) of the toggle lever mechanism (4) being activated, via the spindle drive (2), by an axially movable ramp contour such that the toggle lever (6) is radially splayed so that a lever (7), which is coupled with the toggle lever (6), activates the actuator element; and
   the ramp contour being a ball ramp (8) having a first ring half (9) that is coupled with the spindle drive (2) and a second ring half (10) that is coupled with the toggle lever (6), via a wedge shaped element (11), and the first and the second ring halves (9, 10) being rotatably mounted adjacent each other via at least one roller element (12).

10. An electromechanical actuating assembly for at least an actuator element of a vehicle transmission with at least a drive device which activates a spindle drive (2) for actuating the actuator element, and an actuator device comprising:
   a toggle lever mechanism (4) which is activated via the spindle drive (2);
   the actuator device being positioned either radially inside or radially outside with reference to the actuator element and also being positioned nearly coaxially with a transmission shaft (5) of the vehicle transmission;
   a toggle lever (6) of the toggle lever mechanism (4) is activated, via the spindle drive (2), by an axially movable ramp contour such that the toggle lever (6) is radially splayed so that a lever (7), which is coupled with the toggle lever (6), activates the actuator element;
   the actuator element is a multidisc clutch (3);
   the toggle lever (6), in the actuator device which is positioned radially inside of the multidisc clutch (3), is splayed radially to the outside by the ramp contour such that the lever (7) engages the multidisc clutch (3) by a generated actuator force; and
   the ramp contour is a ball ramp (8) having a first ring half (9) that is coupled with the spindle drive (2) and a second ring half (10) that is coupled with the toggle lever (6), via a wedge shaped element (11), and the first and the second ring halves (9, 10) are rotatably mounted adjacent each other via at least one roller element (12).

* * * * *